US010132535B2

(12) United States Patent
Hattori et al.

(10) Patent No.: US 10,132,535 B2
(45) Date of Patent: Nov. 20, 2018

(54) INVERTER-INTEGRATED ELECTRIC COMPRESSOR

(71) Applicant: MITSUBISHI HEAVY INDUSTRIES THERMAL SYSTEMS, LTD., Minato-ku, Tokyo (JP)

(72) Inventors: Makoto Hattori, Aichi (JP); Takeo Hayashi, Aichi (JP)

(73) Assignee: MITSUBISHI HEAVY INDUSTRIES THERMAL SYSTEMS, LTD., Tokyo (JP)

(*) Notice: Subject to any disclaimer, the term of this patent is extended or adjusted under 35 U.S.C. 154(b) by 0 days.

(21) Appl. No.: 15/109,757

(22) PCT Filed: Jan. 22, 2015

(86) PCT No.: PCT/JP2015/051737
§ 371 (c)(1),
(2) Date: Jul. 5, 2016

(87) PCT Pub. No.: WO2015/141272
PCT Pub. Date: Sep. 24, 2015

(65) Prior Publication Data
US 2016/0327316 A1 Nov. 10, 2016

(30) Foreign Application Priority Data
Mar. 19, 2014 (JP) ................. 2014-056555

(51) Int. Cl.
*H02B 1/26* (2006.01)
*F25B 31/02* (2006.01)
(Continued)

(52) U.S. Cl.
CPC ........... *F25B 31/02* (2013.01); *B60H 1/3222* (2013.01); *B60H 1/3226* (2013.01);
(Continued)

(58) Field of Classification Search
CPC ....... H02K 11/33; B60H 1/3222; F25B 31/02; H02B 1/26
See application file for complete search history.

(56) References Cited

U.S. PATENT DOCUMENTS

| 2003/0200761 A1 | 10/2003 | Funahashi et al. |
| 2007/0231165 A1 | 10/2007 | Koide et al. |
| | (Continued) | |

FOREIGN PATENT DOCUMENTS

| CN | 101187364 A | 5/2008 |
| CN | 102144354 A | 8/2011 |
| | (Continued) | |

OTHER PUBLICATIONS

Chinese Office Action and Search Report issued in Chinese Application No. 201580004262,8 dated Feb. 7, 2017, together with English translations thereof.

*Primary Examiner* — Hoa C Nguyen
*Assistant Examiner* — Keith Depew
(74) *Attorney, Agent, or Firm* — Birch, Stewart, Kolasch & Birch, LLP (57) ABSTRACT

An inverter-integrated electric compressor includes an inverter housing portion, an inverter device including a substrate having an inverter circuit mounted thereon, the inverter device being integrally incorporated in the inverter housing portion, and a busbar assembly formed by a UVW busbar covered by a resin case, the UVW busbar conducting AC power converted by the inverter circuit from the substrate side to a motor terminal. In such a compressor, the busbar assembly includes an adhering partition adhered to an end surface of the substrate using an adhesive, the adhering partition being provided in an upright manner on a lower surface of the resin case of the busbar assembly; a height (H) and a gap (S) of the adhering partition relative to the end surface of the substrate are set as appropriate; and
(Continued)

the adhering partition and the end surface of the substrate are adhered to each other using the adhesive.

7 Claims, 6 Drawing Sheets

(51) Int. Cl.
*F04B 39/00* (2006.01)
*H02M 7/48* (2007.01)
*H02M 7/00* (2006.01)
*F04B 35/04* (2006.01)
*F04B 39/06* (2006.01)
*F04B 39/12* (2006.01)
*H02K 11/33* (2016.01)
*B60H 1/32* (2006.01)
*H02M 7/537* (2006.01)
*F04B 53/22* (2006.01)
*H02K 5/22* (2006.01)

(52) U.S. Cl.
CPC .......... *B60H 1/3229* (2013.01); *F04B 35/04* (2013.01); *F04B 39/00* (2013.01); *F04B 39/06* (2013.01); *F04B 39/121* (2013.01); *F04B 53/22* (2013.01); *H02B 1/26* (2013.01); *H02K 5/225* (2013.01); *H02K 11/33* (2016.01); *H02M 7/003* (2013.01); *H02M 7/48* (2013.01); *H02M 7/537* (2013.01); *B60H 2001/3292* (2013.01); *F25B 2400/077* (2013.01); *F25B 2600/021* (2013.01)

(56) References Cited

U.S. PATENT DOCUMENTS

| | | | |
|---|---|---|---|
| 2008/0116838 A1* | 5/2008 | Hattori | B60H 1/3223 318/722 |
| 2010/0018243 A1* | 1/2010 | Tanaka | F04B 39/121 62/508 |
| 2011/0217190 A1 | 9/2011 | Mizuno et al. | |
| 2011/0236235 A1 | 9/2011 | Hattori et al. | |
| 2011/0261588 A1* | 10/2011 | Hattori | F04B 39/121 363/13 |
| 2013/0224050 A1* | 8/2013 | Nakagami | F01C 21/10 417/410.1 |

FOREIGN PATENT DOCUMENTS

| | | |
|---|---|---|
| CN | 102216616 A | 10/2011 |
| CN | 103119842 A | 5/2013 |
| JP | 2003-259656 A | 9/2003 |
| JP | 2007-263061 A | 10/2007 |
| JP | 2007-295639 A | 11/2007 |
| JP | 2011-163231 A | 8/2011 |
| JP | 2011-220308 A | 11/2011 |
| JP | 4898931 B2 | 3/2012 |
| JP | 2012-120279 A | 6/2012 |
| JP | 2012-193660 A | 10/2012 |
| JP | 2014-173466 A | 9/2014 |

* cited by examiner

INVERTER-INTEGRATED ELECTRIC COMPRESSOR

TECHNICAL FIELD

The present invention relates to an inverter-integrated electric compressor in which an inverter device is integrally incorporated into a housing of the electric compressor.

BACKGROUND ART

Inverter-integrated electric compressors, which integrally incorporate inverter devices, are used as air conditioner compressors installed in electric vehicles, hybrid vehicles, and the like. This inverter-integrated electric compressor converts high-voltage DC power supplied from a power supply unit installed in a vehicle to three-phase AC power of a required frequency by the inverter device, and then applies this power to an electric motor to drive the electric motor.

The inverter device is provided with high-voltage electrical components such as a coil and a smoothing capacitor that constitute a filter circuit, and a plurality of semiconductor switching elements that constitute a switching circuit which converts electricity, an inverter substrate on which inverter circuits, including the filter circuit and the switching circuit, and control circuits of the inverter circuits are mounted, a substrate on which a communication circuit is mounted into which control signals from a host control device (ECU) are input, and the like. The inverter device is configured to convert DC that is input from a power supply unit to a P-N terminal via the power source cable to three-phase AC power and to output the three-phase AC power via a UVW busbar or the like.

The inverter device is integrated with the electric compressor by being incorporated into an inverter housing portion provided to the housing outer periphery of the electric compressor, and is configured to apply the three-phase AC power output via the UWV busbar or the like to an electric motor inside the housing, via a motor terminal that is provided in the inverter housing portion so as to pass through the housing. In Patent Document 1, a device is disclosed that outputs AC power, which is converted by an inverter module, to a motor terminal via a UVW busbar that is integrally insert-molded using a resin material.

Further, the inverter substrate is normally supported inside the inverter housing portion via a support leg, a bolt, or the like, and inverter components such as capacitors, coils, and semiconductor switching elements are mounted on the substrate by their terminals connected to the substrate. In Patent Documents 2 and 3, devices are disclosed that incorporate an inverter device in which these inverter components are disposed between the inverter substrate and a bottom surface of the inverter housing portion.

CITATION LIST

Patent Documents

Patent Document 1: Japanese Patent No. 4898931
Patent Document 2: Japanese Unexamined Patent Application Publication No. 2007-295639A
Patent Document 3: Japanese Unexamined Patent Application Publication No. 2012-193660A

SUMMARY OF INVENTION

Technical Problem

The inverter-integrated electric compressor installed in a vehicle as an air conditioner is exposed to severe vibration, making inverter device vibration countermeasures an important issue. In particular, while an inverter substrate having an inverter circuit and the control circuits of the inverter circuit mounted thereon is incorporated so that, when the inverter substrate is quadrilateral in shape, for example, at least four corners of the substrate are fixedly supported, a large number of circuit parts and electronic parts are mounted on the substrate, resulting in failure to adequately suppress bending caused by vibration by merely fixedly supporting the four corners. This has led to an increase in the number of support locations.

However, a reckless increase in the number of support locations is by no means considered a favorable measure. Not only are there space restrictions, but the number of parts utilized for support is uselessly increased, resulting in increases in cost as well as assembly man-hours. The devices disclosed in Patent Documents 1 to 3 also do not suggest proactively utilizing inverter components such as a UVW busbar, a capacitor, a coil, or a semiconductor switching element mounted on the substrate in a substrate vibration countermeasure, and avoid the generation of unnecessary stress by filling areas with a gel material or the like.

Here, the applicant has proposed a device that uses relatively large electrical components such as a smoothing capacitor, a coil, or a semiconductor switching element such as an insulated-gate bipolar transistor (IGBT), which are inverter device components, to support the inverter substrate from below and ensure rigidity against vibration in Japanese Unexamined Patent Application No. 2013-45359A, but further improvement has been in demand.

In light of the above, an object of the present invention is to provide an inverter-integrated electric compressor that has an improved coupling structure of a busbar assembly and a substrate and allows support of one side of the substrate by the busbar assembly in order to effectively utilize a busbar that connects the substrate and a motor terminal and improve the vibration resistance of the substrate.

Solution to Problem

The inverter-integrated electric compressor of the present invention employs the following means to solve the problems described above.

An inverter-integrated electric compressor according to the present invention includes a housing; an inverter housing portion provided to the housing; an inverter device including a substrate having an inverter circuit mounted thereon, the inverter device being integrally incorporated in the inverter housing portion; and a busbar assembly formed by a UVW busbar covered by the resin case, the UVW busbar being configured to conduct AC power converted by the inverter circuit from the substrate side to a motor terminal provided in the inverter housing portion. In such an inverter-integrated electric compressor, the busbar assembly includes an adhering partition to be adhered to an end surface of the substrate using an adhesive, the adhering partition being provided in an upright manner on a lower surface of the resin case, a height and a gap of the adhering partition relative to the end surface of the substrate are set as appropriate, and the adhering partition and the end surface of the substrate are adhered to each other using the adhesive.

According to the present invention, the inverter-integrated electric compressor includes the housing; the inverter housing portion provided to the housing; the inverter device including the substrate having the inverter circuit mounted thereon, the inverter device being integrally incorporated in the inverter housing portion; and the busbar assembly formed by the UVW busbar covered by the resin case, the UVW busbar being configured to conduct AC power converted by the inverter circuit from the substrate side to the motor terminal provided in the inverter housing portion. In such an inverter-integrated electric compressor, the busbar assembly includes the adhering partition to be adhered to the end surface of the substrate using an adhesive, the adhering partition being provided in an upright manner on the lower surface of the resin case of the busbar assembly, the height and the gap of the adhering partition relative to the end surface of the substrate are set as appropriate, and the adhering partition and the end surface of the substrate are adhered to each other using the adhesive. This makes it possible to electrically connect the substrate and the motor terminal via the busbar assembly that is covered with the resin case to be insulated. Further, the adhesive is poured in the interval between the end surface of the substrate and the adhering partition provided in an upright manner on the lower surface of the resin case to strongly adhere and integrate the substrate with the busbar assembly covered by the resin case, and the busbar assembly is connected to the motor terminal, making it possible to fixedly support one side of the substrate via the busbar assembly and the motor terminal. Thus, in addition to the substrate being fixedly supported at multiple locations inside the inverter housing portion, at least one side of the substrate is fixedly supported via the busbar assembly and the motor terminal that have been securely insulated, thereby making it possible to improve the insulation and vibration resistance of the inverter device.

Furthermore, in addition to the configuration of the above-described inverter-integrated electric compressor, the inverter-integrated electric compressor of the present invention is configured so that a plurality of locking tabs are provided at predetermined intervals on the lower surface of the resin case of the busbar assembly where the adhering partition is provided in an upright manner, the locking tabs including fitting portions that fit together with an end portion of the substrate.

According to the present invention, the plurality of locking tabs are provided on the lower surface of the resin case of the busbar assembly where the adhering partition is provided in an upright manner, the locking tabs including fitting portions that fit together with the end portion of the substrate, making it possible to fit and temporarily assemble the fitting portions of the locking tabs onto the end portion of the substrate and adhere the adhering partition with the adhering partition aligned with the end surface of the substrate when assembling the busbar assembly to the substrate by adhering. This makes it possible to accurately and strongly adhere and fix the busbar assembly to the substrate, ensure favorable assemblability, and increase a support strength of the substrate.

In addition to the configuration of the above-described inverter-integrated electric compressor, the inverter-integrated electric compressor of the present invention is configured so that the lower surface of the resin case of the busbar assembly where the adhering partition is provided in an upright manner is formed separately as a cover member, the cover member is assembled to the resin case by the locking tabs integrally formed with the resin case and passing through the cover member, and the adhering partition is adhered to the end surface of the substrate and to the locking tabs via the adhesive.

According to the present invention, the lower surface of the resin case of the busbar assembly where the adhering partition is provided in an upright manner is formed separately as a cover member, the cover member is assembled to the resin case by the locking tabs integrally formed with the resin case and passing through the cover member, and the adhering partition is adhered to the end surface of the substrate and to the locking tabs via the adhesive. Separate formation of the lower surface of the resin case of the busbar assembly where the adhering partition is provided in an upright manner as the cover member makes it possible to eliminate the risk of a resin material entering a connector terminal portion provided to a tip of the busbar assembly when the busbar assembly is integrally insert-molded using the resin material, and thus easily manufacturing a busbar assembly having a section that connects with the motor terminal formed into a connector terminal is possible. Further, the separately formed cover member is assembled to the resin case by the locking tabs passing through the cover member, and the cover member is adhered to the locking tabs along with the end surface of the substrate and the adhering partition by adhesive, thereby making it possible to integrate the cover member with the resin case. The connection to the motor terminal of the busbar assembly is thus formed into a connector terminal, making it possible to omit welding or soldering and thus improve assemblability, and couple the resin case and the cover member more strongly.

Furthermore, in addition to the configuration of the above-described inverter-integrated electric compressor, the inverter-integrated electric compressor of the present invention is configured so that the resin case includes a partition wall that has a predetermined height to block a flow of the adhesive, the partition wall being provided on the lower surface of the resin case, between a position where the adhering partition is provided in an upright manner and a connector terminal of the busbar assembly to be inserted into the motor terminal.

According to the present invention, the resin case includes the partition wall that has a predetermined height to block the flow of the adhesive. The partition wall is provided on the lower surface of the resin case, between the position where the adhering partition is provided in an upright manner and the connector terminal of the busbar assembly to be inserted into the motor terminal. As a result, when the substrate and the busbar assembly are adhered by the adhesive flowing into the above-described gap, the flow of the adhesive is blocked by the partition wall even when excess adhesive flows toward the connector terminal provided to the tip of the busbar assembly, making it possible to eliminate the risk of the connector terminal being sealed off by the adhesive. This makes it possible to prevent deterioration of assemblability by the reckless flow of the adhesive.

Furthermore, in addition to the configuration of the above-described inverter-integrated electric compressor, the inverter-integrated electric compressor of the present invention is configured so that the substrate has one side that is fixedly supported by the inverter housing portion via the busbar assembly and the motor terminal, and another two sides adjacent to the one side that are fixedly supported by the inverter housing portion via a coil and a capacitor that constitute a filter circuit of the inverter device, and a terminal group of a plurality of semiconductor switching elements that constitute the inverter circuit, respectively.

According to the present invention, the substrate has one side that is fixedly supported by the inverter housing portion via the busbar assembly and the motor terminal, and another two sides adjacent to the one side that are fixedly supported by the inverter housing portion via the coil and the capacitor that constitute the filter circuit of the inverter device, and the terminal group of the plurality of semiconductor switching elements that constitute the inverter circuit, respectively. This makes it possible to support three sides of the substrate using a substrate support portion having a Π-shaped layout based on a group of three serial components of the inverter device, in addition to fixedly supporting each corner of the substrate by the inverter housing portion. As a result, the substrate can be strongly fixedly supported by components, that is, the components of the inverter device, other than the dedicated support parts, making it possible to not only improve the vibration resistance but also decrease the number of dedicated support parts and thus reduce costs.

Advantageous Effects of Invention

According to the present invention, it is possible to electrically connect the substrate and the motor terminal via the busbar assembly insulated by the resin case covering the UVW busbar. Further, adhesive is poured in the interval between the end surface of the substrate and the adhering partition provided in an upright manner on the lower surface of the resin case to strongly adhere and integrate the substrate with the busbar assembly covered by the resin case, and the busbar assembly is connected to the motor terminal, making it possible to fixedly support one side of the substrate via the busbar assembly and the motor terminal. This allows the substrate to be fixedly supported on at least one side of the substrate via the busbar assembly and the motor terminal that are securely insulated in addition to being fixedly supported at multiple locations inside the inverter housing portion, thereby making it possible to fixedly support the substrate more strongly, and improve the insulation and vibration resistance of the inverter device.

DESCRIPTION OF EMBODIMENT

An embodiment of the present invention will be described below with reference to FIGS. 1 to 6.

Figure 1:
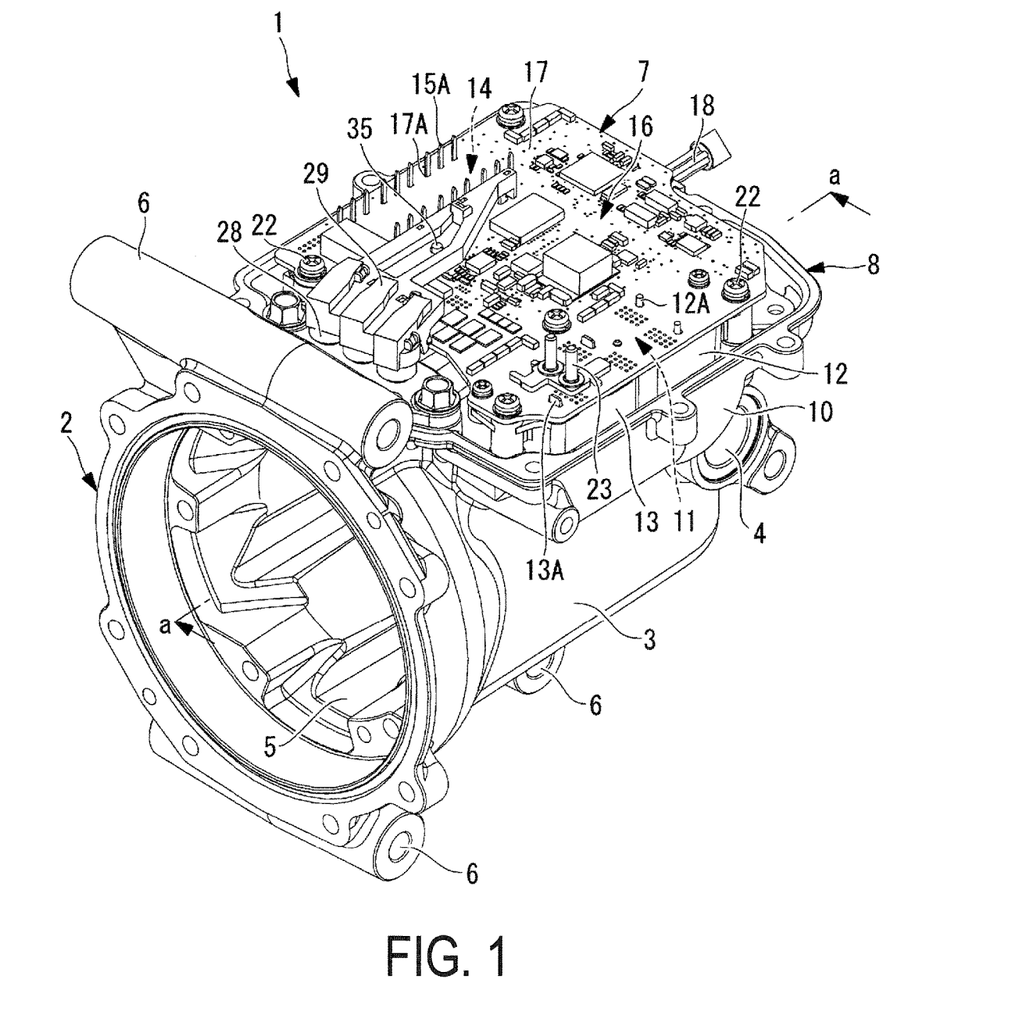
FIG. 1 is a perspective view illustrating a configuration of main components of an inverter-integrated electric compressor according to an embodiment of the present invention.
Figure 2:
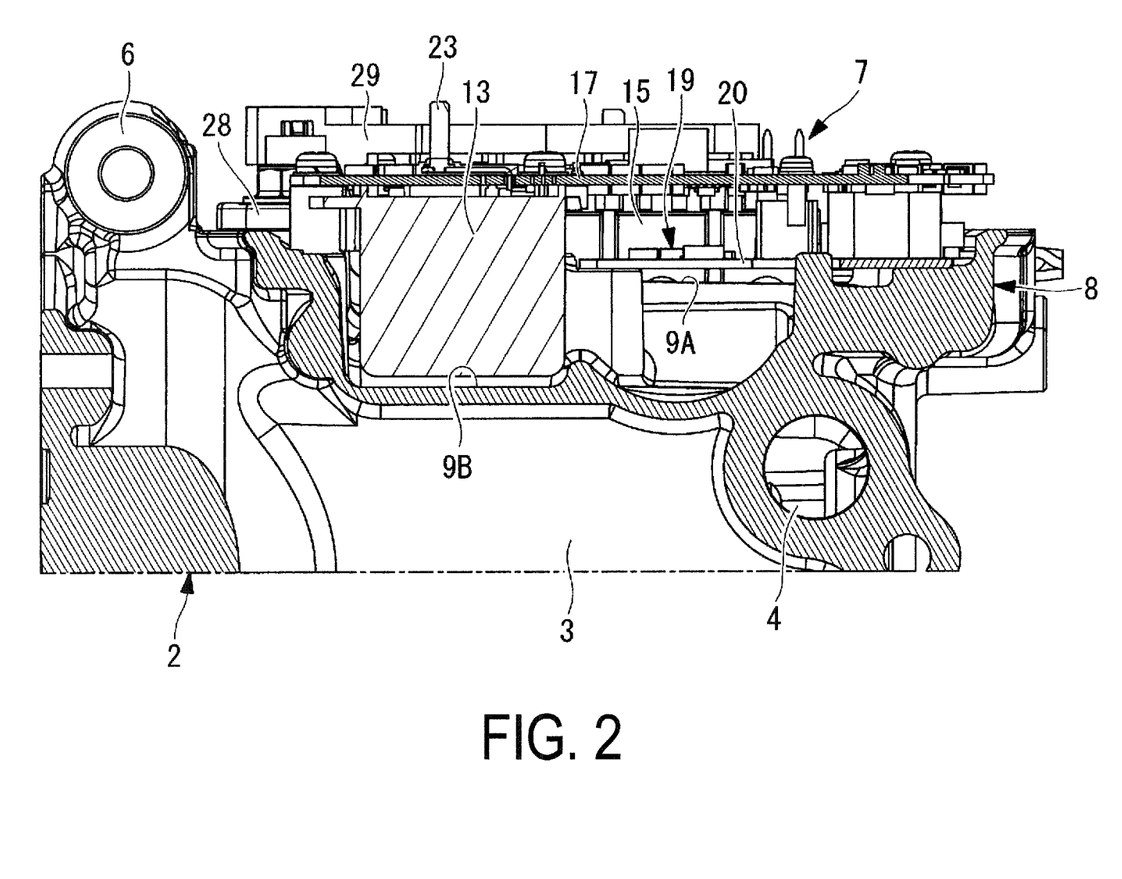
FIG. 2 is a longitudinal cross-sectional view taken along a-a in FIG. 1.
Figure 3:
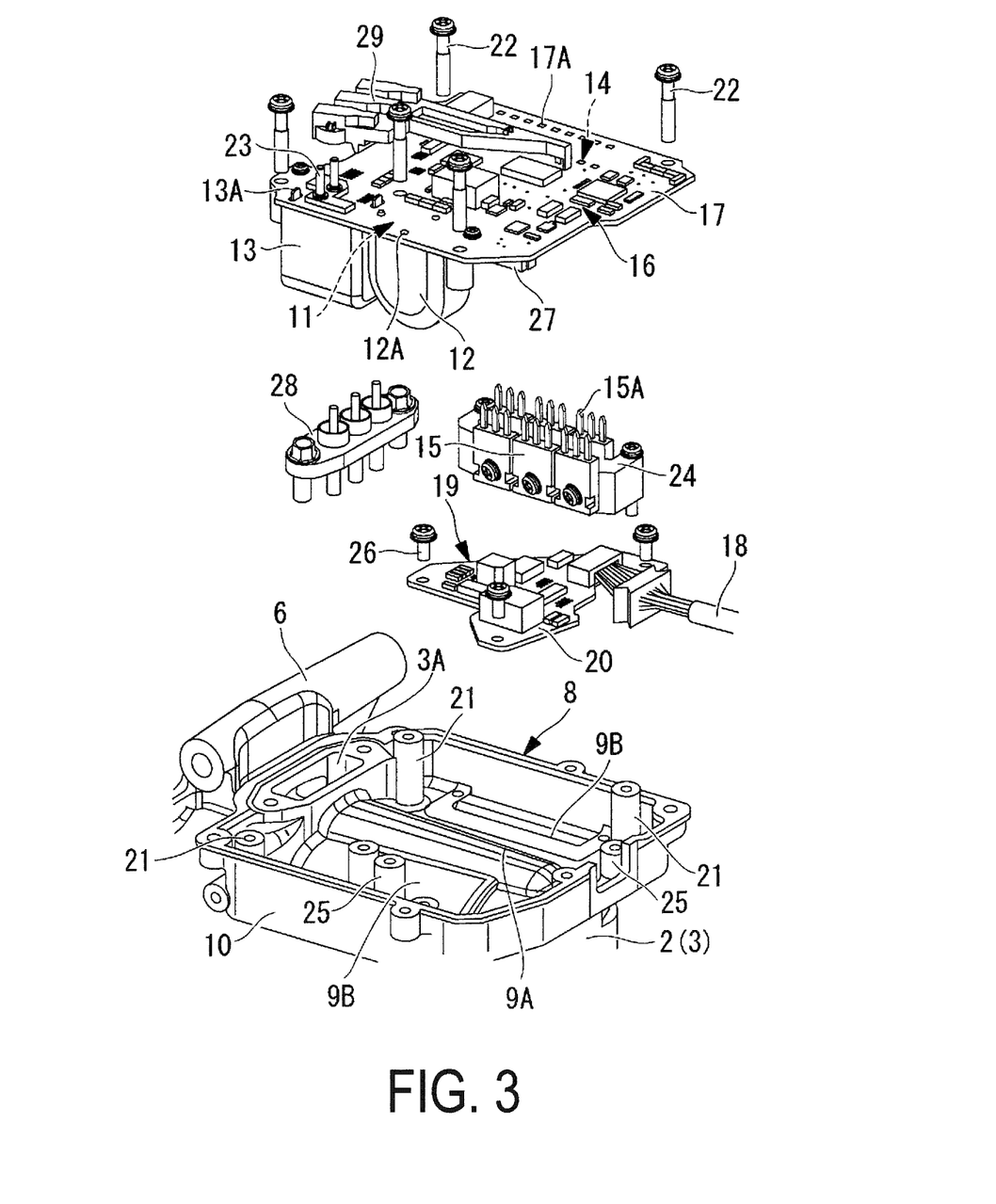
FIG. 3 is an exploded perspective view of an inverter device that is integrally incorporated into the inverter-integrated electric compressor.
Figure 4:
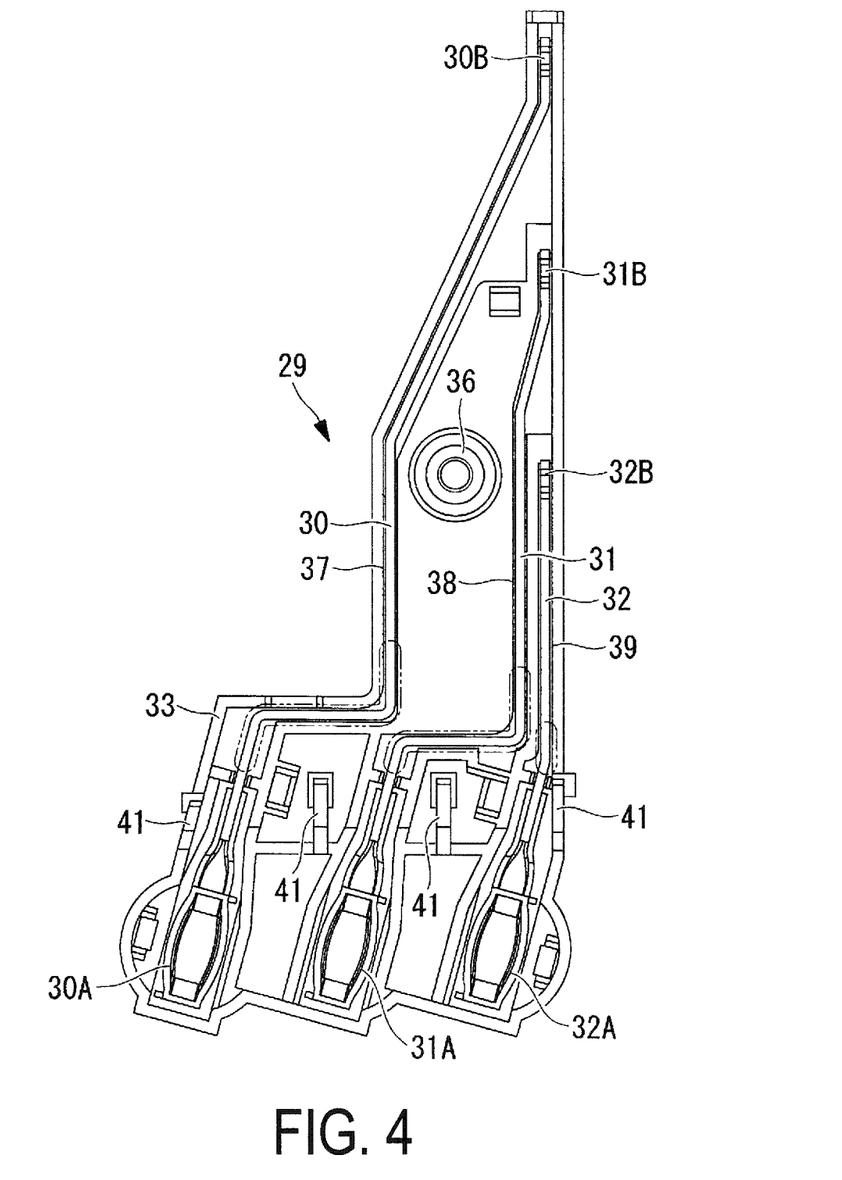
FIG. 4 is a rear view of a busbar assembly that uses the inverter device.
Figure 5:
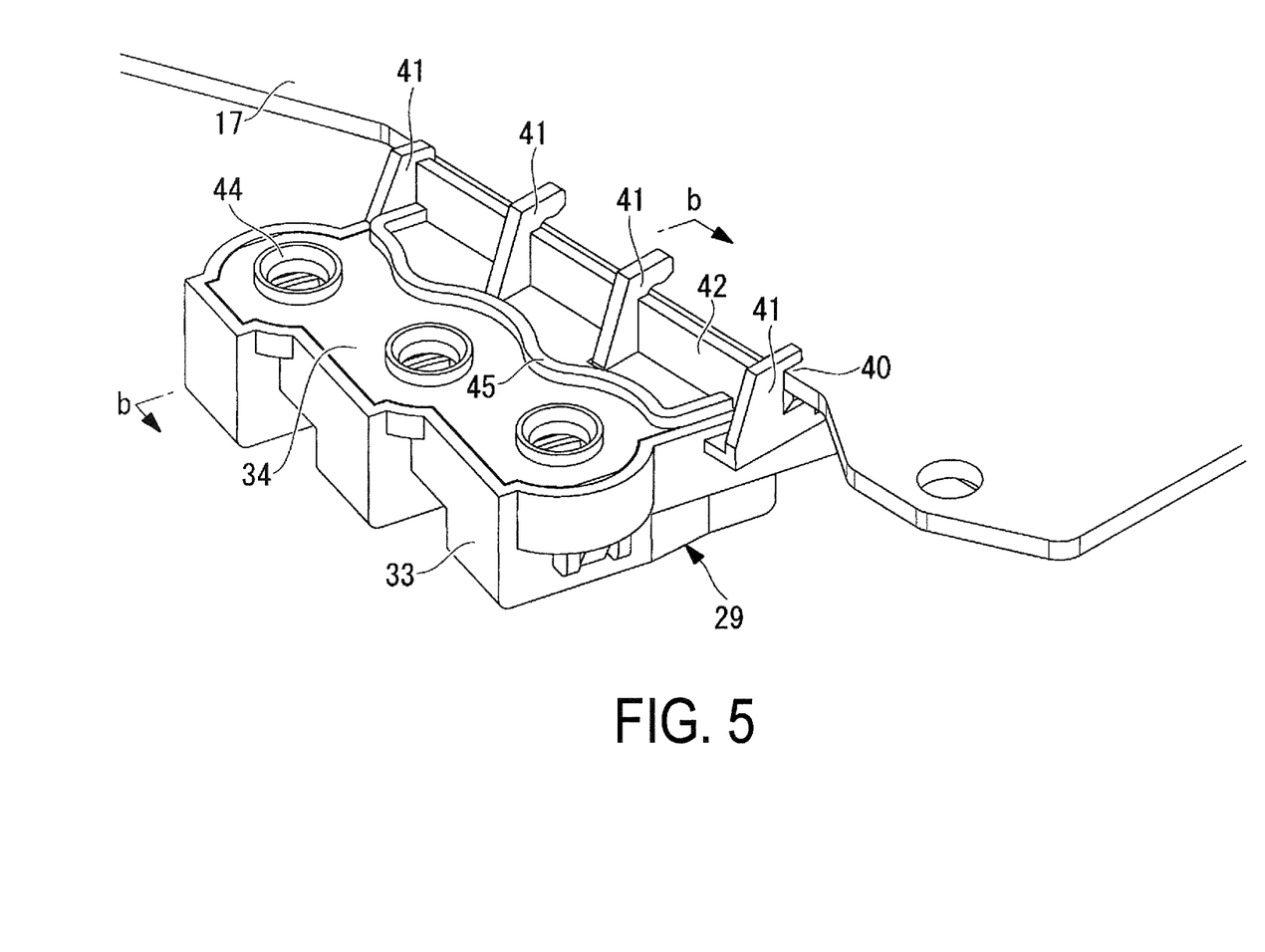
FIG. 5 is a perspective view of an adhering portion of the busbar assembly and a substrate, as viewed from the back side.
Figure 6:
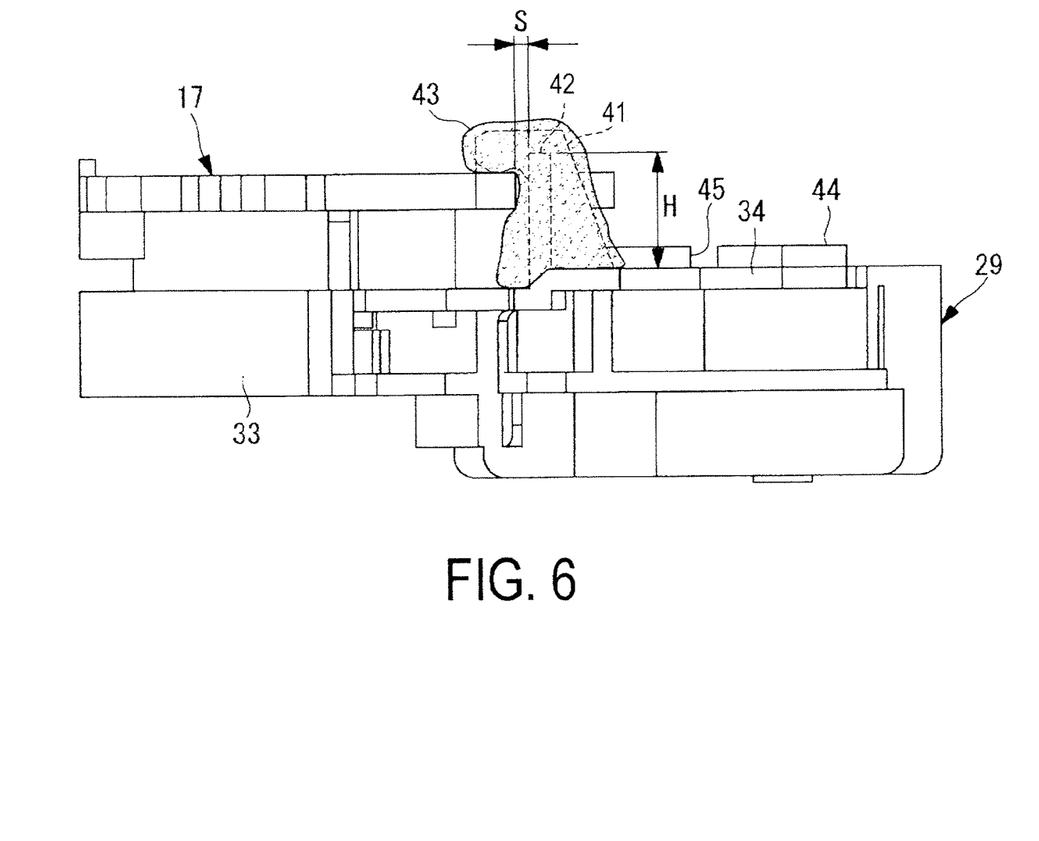
FIG. 6 is a cross-sectional view taken along b-b in FIG. 5.

FIG. 1 is a perspective view illustrating main components of an inverter-integrated electric compressor according to an embodiment of the present invention. FIG. 2 is a longitudinal cross-sectional view taken along a-a in FIG. 1. FIG. 3 is an exploded perspective view of an inverter device, FIG. 4 is a rear view of a busbar assembly, FIG. 5 is a perspective view of an adhering portion of the busbar assembly and a substrate as viewed from a back side, and FIG. 6 is a cross-sectional view taken along b-b in FIG. 5.

An inverter-integrated electric compressor 1 is provided with a cylindrical housing 2 constituting an outer shell. The housing 2 is constituted by an aluminum die-cast motor housing 3 with a built-in electric motor (not illustrated) and an aluminum die-cast compressor housing (not illustrated) with a built-in compression mechanism (not illustrated) integrally coupled together.

Here, the inverter-integrated electric compressor 1 is configured so that the electric motor disposed inside the housing 2 and the compression mechanism are connected via a rotation shaft, and the compression mechanism is driven as a result of the electric motor being rotationally driven via an inverter device 7, which will be described below. Low-pressure refrigerant gas, sucked into the electric motor from an intake port 4 provided in a side surface of the motor housing 3 on a rear end side of the motor housing 3, is sucked through the periphery of the electric motor, compressed by the compression mechanism to a high pressure, discharged into the compressor housing, and then discharged to the outside via a discharge port provided on the compressor housing side.

A plurality of refrigerant flow paths 5 are formed in the motor housing 3 to allow refrigerant to flow in the axial direction along the inner peripheral surface of the motor housing 3, and a plurality of legs 6 for mounting the electric compressor 1 are provided on the outer periphery of the motor housing 3. An inverter housing portion 8 for integrally incorporating the inverter device 7 is also integrally formed with the outer periphery of the housing 2 (on the motor housing 3 side). This inverter housing portion 8 has a rectangular shape in a plan view in which the bottom portion has a shape following an outer peripheral wall of the motor housing 3, and a convex ridge line portion 9A corresponding to the refrigerant flow path 5 is formed in the center portion. In addition, concave portions 9B following the housing outer peripheral wall are formed on both side portions of the inverter housing portion 8, and a flange portion 10 is erected around the periphery.

In the motor housing 3, draft angles are provided from a front end side where the compressor housing is coupled with the motor housing 3 toward a rear end side, and the refrigerant flow paths 5, provided on the inner peripheral side, have a cross-sectional area which increases in size from the intake port 4 side to the compression mechanism side. As a result, the ridge line portion 9A formed on the bottom surface in the inverter housing portion 8 and the like are correspondingly inclined downwards from the front toward the back.

The inverter housing portion 8 is configured so as to be hermetically sealed by a cover member (not illustrated) attached to the flange portion 10 after the inverter device 7 is incorporated. A connector connectable to a P-N terminal 23 provided on a main substrate 17, which will be described below, is provided on an inner surface side of this cover member, and high-voltage DC power is input to the inverter device 7 via a high-voltage cable, the connector, and the P-N terminal 23 from a power supply unit installed in the vehicle via the high-voltage cable (power supply cable) connected to the connector.

As is well-known, the inverter device 7 converts high-voltage DC power supplied from the power supply unit installed in the vehicle to three-phase AC power of a required frequency on the basis of a command from a host control device, and applies the AC power to an electric motor to rotationally drive the electric motor. As illustrated in FIG. 1 to FIG. 3, the inverter device 7 is integrally incorporated with the inverter housing portion 8 provided on the outer periphery of the housing 2.

The inverter device 7 includes high-voltage electrical components (hereinafter also referred to simply as electrical components), such as a coil 12 and a capacitor 13 in a case that constitute a known noise-removing filter circuit 11; a plurality (six) of semiconductor switching elements 15, such as insulated-gate bipolar transistors (IGBTs), that constitute a known switching circuit 14 that converts DC power to three-phase AC power; the rectangular main substrate (hereinafter also simply referred to as substrate) 17 on which is mounted a control circuit (an inverter circuit) 16 that includes an inverter circuit, which includes the filter circuit 11 and the switching circuit 14, a microcomputer that controls the inverter circuit, and the like; and a sub-substrate 20 that is provided with a communication circuit 19 to which is connected a communication cable 18 from a host control device, and the like.

The inverter device 7 used may be a known inverter device. Here, however, as the main substrate 17, a substrate is used on which the electrical components such as the coil 12 and the capacitor 13 constituting the filter circuit 11 are mounted by soldering lead terminals 12A, 13A of the coil 12 and the capacitor 13, and the plurality of semiconductor switching elements 15 such as IGBTs constituting the switching circuit 14 are mounted by soldering lead terminals 15A of the semiconductor switching elements 15 (each IGBT has three lead terminals 15A to make a total of 18).

In other words, the lead terminals 12A, 13A of the coil 12 and the capacitor 13 constituting the filter circuit 11 and the lead terminals 15A of the plurality of semiconductor switching elements 15 constituting the switching circuit 14 are passed through through-holes of the main substrate 17 and soldered to a pattern on the main substrate 17, forming the filter circuit 11 and the switching circuit 14 on the main substrate 17. The main substrate 17 is fixed by the four corners thereof fastened to bosses 21 provided in the four corners of the inverter housing portion 8 using screws 22.

The capacitor 13, which is one of the high-voltage electrical components constituting the filter circuit 11, is housed in a case. The capacitor 13 housed in the case has a rectangular external shape (a cuboid shape) and a planar upper surface, as illustrated in FIG. 2 and FIG. 3. Similarly, the coil 12 wound into a cylindrical shape is housed in a case having a semi-cylindrical shape of which the upper surface is a planar shape. Then, the coil 12 and the capacitor 13 are mounted so as to be aligned along one side of the rectangular main substrate 17.

The coil 12 and the capacitor 13 mounted on the main substrate 17 are fixedly installed using an adhesive onto a bottom surface corresponding to the concave portion 9B, which is located on one side portion of the inverter housing portion 8 and extends in the axial direction along the outer peripheral wall of the cylindrical housing 2 constituting the bottom surface of the inverter housing portion 8. As a result, the lower surface of the main substrate 17 is supported by the planar upper surfaces of the cases of the coil 12 and the capacitor 13, enabling stress and vibration applied to the main substrate 17 to be supported. In addition, the connector connected to the power supply cable is fitted to the upper surface of a portion supported by the capacitor 13 of the main substrate 17, which is supported by the coil 12 and capacitor 13 from the lower surface thereof. In the portion, the P-N terminal 23 for inputting DC power from a power source to the inverter device 7 is provided in an upright manner.

As illustrated in FIG. 3, the plurality (six) of semiconductor switching elements 15 are fixedly installed on a heat-radiating block 24 provided in an upright manner on the concave portion 9B, which is located on the other side portion of the inverter housing portion 8 and extends in the axial direction along the outer peripheral wall of the cylindrical housing 2 constituting the bottom surface of the inverter housing portion 8. The heat-radiating block 24 is a cuboid-shaped block with a predetermined length made of an aluminum alloy which is a heat conductive material. The heat-radiating block 24 is three-dimensionally disposed with the semiconductor switching elements 15 being screwed and fixed in sets of three on the vertical side surfaces of both the left and right sides of the heat-radiating block 24 and three lead terminals 15A extending vertically upward. The heat-radiating block 24 has a function of radiating heat generated by the semiconductor switching elements 15 to the housing 2 side and cooling the semiconductor switching elements 15.

As illustrated in FIG. 1, a total of 18 of the lead terminals 15A of the plurality of semiconductor switching elements 15 installed as described above is passed through through-holes 17A provided along the other side opposing the one side of the main substrate 17, which is supported by the coil 12 and capacitor 13, so as to protrude upward, and then soldered, thereby mounting the plurality of semiconductor switching elements 15 on the main substrate 17. Due to this, the other side of the main substrate 17 is supported from below by the large number of lead terminals 15A of the plurality of semiconductor switching elements 15. Here, the heat-radiating block 24 is screwed and fixed onto the concave portion 9B of the inverter housing portion 8, but may be configured to be integrally formed on the motor housing 3 side.

Further, to the rear of the central portion of the bottom surface of the inverter housing portion 8, the sub-substrate 20, on which the communication circuit 19 to which the communication cable 18 is connected is mounted, is fixedly installed on bosses 25 in three locations, via screws 26, so that the sub-substrate 20 does not come into contact with the convex ridge line portion 9A. The sub-substrate 20 is provided between the coil 12 and the capacitor 13, and the plurality of semiconductor switching elements 15, which are disposed on both the left and right sides of the inverter housing portion 8, with the main substrate 17 disposed above the sub-substrate 20. The sub-substrate 20 is electrically and mechanically connected with the main substrate 17 disposed above via an inter-substrate connection terminal 27 (refer to FIG. 3). Accordingly, the main substrate 17 is supported from below by the inter-substrate connection terminal 27 as well.

Furthermore, the power converted from DC power to three-phase AC power through the switching circuit 14 of the inverter device 7 can be output from the main substrate 17 to a motor terminal 28 via a busbar assembly 29. The motor terminal 28 is installed in a terminal installation hole 3A (refer to FIG. 3) which is provided at the front of the inverter housing portion 8 and passes through the motor housing 3. The motor terminal 28 applies the three-phase AC power output from the inverter device 7 via the busbar assembly 29 to the electric motor in the motor housing 3.

One end of the busbar assembly 29 is connected to a UVW land on the main substrate 17, and the other end is connected to the motor terminal 28. As illustrated in FIG. 4, the busbar assembly 29 is constituted by busbars 30, 31, 32, which are made of a conductive member formed by three long thin copper plates of a U phase, a V phase, and a W phase, a resin case 33 that houses the three UVW busbars 30, 31, 32 to join the three UVW busbars 30, 31, 32 together, and a cover member 34 (refer to FIG. 5) mounted on a lower surface of the resin case 33. The busbar assembly 29 includes a screw fastening boss 36 in a center section thereof. This screw fastening boss 36 is for fixedly installing the busbar assembly 29 as an integrated component onto the main substrate 17 via a screw 35 and, as will be described below, is adhered and fixed by an adhesive to an end portion of a front end side of the main substrate 17.

To avoid interference with circuit components disposed on the main substrate 17, each of the three UVW busbars 30, 31, 32 has at least one curved portion including a crank-shaped curved portion. The three UVW busbars 30, 31, 32 includes connector terminals 30A, 31A, 32A at one end portions thereof to be connected to the motor terminal 28, the connector terminals 30A, 31A, 32A being connected to three UVW terminals of the motor terminal 28 by insertion. The three UVW busbars 30, 31, 32 further include connecting portions 30B, 31B, 32B at the other end portions to be connected to the UVW land on the main substrate 17.

The resin case 33 is formed into a fan shape that is flared from one end side to the other end side, and three grooves 37, 38, 39 for inserting the three UVW busbar 30, 31, 32 and the connector terminals 30A, 31A, 32A are integrally formed on the lower surface side thereof. The three UVW busbars 30, 31, 32, which are formed into long, thin plate shapes and vibrate due to the effects of vibration caused by a road surface and the like during vehicle travel, are inserted and disposed into these three grooves 37, 38, 39, and adhered and fixed by a resin adhesive near (in the range surrounded by the two dotted line illustrated in FIG. 4) the curved portion curved into a crank shape.

Furthermore, the cover member 34 is mounted and integrated with the lower surface side of the resin case 33, as illustrated in FIG. 5 and FIG. 6. This cover member 34 is assembled to the resin case 33 by a plurality of locking tabs 41 that pass through the cover member 34, the locking tabs 41 being integrally formed at predetermined intervals on the resin case 33 side and including fitting portions 40 to be fitted together with an end portion of the main substrate 17. The cover member 34 includes an adhering partition 42, which has a predetermined height H and extends vertically downward, on one end portion side of the cover member 34.

The adhering partition 42 is provided adjacent to the end surface of the front end portion of the main substrate 17 with a predetermined gap S established relative to the end surface, and configured to be adhered and fixed to the end surface of the main substrate 17 as well as to the locking tabs 41 by pouring, for example, a silicon resin adhesive into the gap S. An adhesive 43 solidified around the adhering partition 42 is indicated by a dashed line in FIG. 6. This makes it possible to adhere and fix the adhering partition 42 corresponding to the tip side of the busbar assembly 29 with the adhesive 43 to the end surface of the main substrate 17 with the fitting portions 40 of the locking tabs 41 fitted together with the end portion of the main substrate 17.

Thus, the busbar assembly 29 and the main substrate 17 can be coupled and integrated at two front and back locations, which include a coupling portion, by the screw 35, resulting in a configuration that allows the front end side of the main substrate 17 to be fixedly supported by the inverter housing portion 8 via the busbar assembly 29 and the motor terminal 28 by inserting the connector terminals 30A, 31A, 32A of the busbar assembly 29 into the three UVW terminals and thus connecting the connector terminals 30A, 31A, 32A to the motor terminal 28.

Further, three round holes 44 having burr-machined peripheries are provided to areas corresponding to the connector terminals 30A, 31A, 32A, on the lower surface of the cover member 34, and a partition wall 45 that has a predetermined height to prevent the flow of the adhesive 43 from sealing off the connector terminals 30A, 31A, 32A is provided in an upright manner between the three round holes 44 and the adhering partition 42.

Note that while, in the present embodiment, the adhering partition 42 has a height H so that the adhering partition 42 extends downward beyond the back side of the main substrate 17, the end portion of the adhering partition 42 may be flush with or above the back side of the main substrate 17, taking into consideration a type, a liquidity, and the like of the adhesive 43 used. In certain cases, the adhering partition 42 may be provided so as to be on the front side of the main substrate 17. Further, the gap S between the adhering partition 42 and the end surface of the main substrate 17 may also be suitably and appropriately set in accordance with the type, the liquidity, and the like of the adhesive 43.

As described above, in the present embodiment, not only is the main substrate 17, which is installed in the inverter housing portion 8, fixedly supported at the four corners thereof by the bosses 21 using the screws 22, but one side of the main substrate 17 is also supported from below using the coil 12 and the capacitor 13, which are high-voltage electrical components constituting the filter circuit 11 of the inverter device 7, and the other side facing the one side is supported from below by the large number of lead terminals 15A of the plurality of semiconductor switching elements 15, such as IGBTs, constituting the switching circuit 14 of the inverter device 7.

Furthermore, the busbar assembly 29 that is provided to the main substrate 17, connects the UVW land of the switching circuit 14 with the motor terminal 28, and supplies three-phase AC power converted on the inverter device 7 side to the electric motor side is not just fixed by the screw 35 on the main substrate 17 side. That is, the adhering partition 42 is provided on the lower surface at the tip side of the busbar assembly 29 and is strongly adhered, fixed, and integrated by the adhesive 43 with the end surface of the main substrate 17, making it possible to fixedly support the front end side of the main substrate 17 by the motor terminal 28 via the busbar assembly 29.

Fixedly supporting the front end side of the main substrate 17 in addition to at least the above-described four corners and the two sides facing each other makes it possible to further increase the vibration resistance of the main substrate 17. That is, such a configuration makes it possible to support three of the four sides of the quadrilateral main substrate 17 by a substrate support portion having a Π-shaped layout based on a group of three serial components, including the coil 12 and the capacitor 13 of the filter circuit 11, the plurality of semiconductor switching elements 15 of the switching circuit 14, and the busbar assembly 29 that constitute the inverter device 7, and house and install the main substrate 17 in the inverter housing portion.

As a result, according to the present embodiment, the main substrate 17 can be strongly fixedly supported by effectively utilizing components, that is, the components of the inverter device 7, other than the dedicated support parts, and stresses such as vibrating force applied to the main substrate 17 upon propagation of travel vibration of the vehicle and the like are dispersed and alleviated by being received by the large number of support points and fixing points, thereby making it possible to not only improve vibration resistance but also decrease the number of dedicated support parts and reduce cost.

Further, the busbar assembly 29 is constituted by the three UVW busbars 30, 31, 32 covered by the resin case 33, the adhering partition 42 connected via the adhesive 43 to the end surface of the main substrate 17 is provided in an upright manner on the lower surface of the resin case 33, and the height H and the gap S of the adhering partition 42 relative to the end surface of the main substrate 17 are set as appropriate to adhere and fix the adhering partition 42 to the main substrate 17 using the adhesive 43, thereby electrically connecting the main substrate 17 and the motor terminal 28 via the busbar assembly 29 insulated by the resin case 33. This makes it possible to ensure the electrical insulation between the main substrate 17 and the motor terminal 28 and fixedly support one side of the main substrate 17 by the motor terminal 28 using the busbar assembly 29 as a support member.

Thus, in addition to the main substrate 17 being fixedly supported at multiple necessary locations inside the inverter housing portion 8, at least one side of the main substrate 17 is fixedly supported via the busbar assembly 29 that has been securely insulated and the motor terminal 28, thereby making it possible to fixedly support the main substrate 17 more strongly and improve the electrical insulation and the vibration resistance of the inverter device 7.

Further, in the present embodiment, the locking tabs 41 provided with the fitting portions 40 that fit together with the end portion of the main substrate 17 are provided in multiple locations at predetermined intervals on the lower surface of the resin case 33 of the busbar assembly 29 where the adhering partition 42 is provided in an upright manner. This makes it possible to fit and temporarily assemble the fitting portions 40 of the locking tabs 41 onto the end portion of the main substrate 17 and adhere the adhering partition 42 with the adhering partition 42 aligned with the end surface of the main substrate 42 when assembling the busbar assembly 29 by adhering to the main substrate 17. This makes it possible to accurately and strongly adhere and fix the busbar assembly 29 to the main substrate 17, ensure favorable assemblability, and increase the support resistance of the main substrate 17.

Furthermore, the lower surface where the adhering partition 42 of the resin case 33 of the busbar assembly 29 is provided in an upright manner is formed separately as the cover member 34, the cover member 34 is assembled to the resin case 33 by the locking tabs 41 integrally formed with the resin case 33 and passing through the cover member 34, and the adhering partition 42 is adhered to the locking tabs 41 and to the end surface of the main substrate 17 via the adhesive 43. Separate formation of the lower surface of the resin case 33 of the busbar assembly 29 where the adhering partition 42 is provided in an upright manner as the cover member 34 makes it possible to eliminate the risk of resin material entering the connector terminals 30A, 31A, 32A provided to the tip of the busbar assembly 29 when the busbar assembly 29 is integrally insert-molded using the resin material, and easily manufacture the busbar assembly 29 with the section that connects to the motor terminal 28 formed into connector terminals.

Further, after the separately formed cover member 34 is assembled to and integrated with the resin case 33 by the locking tabs 41 passing through the cover member 34, the cover member 34 can be adhered to the locking tabs 41 by the adhesive 43 along with the end surface of the main substrate 17 and the adhering partition 42. The connection of the busbar assembly 29 to the motor terminal 28 is thus formed into connector terminals, making it possible to omit welding or soldering and thus improve assemblability, and couple the resin case 33 and the cover member 34 more strongly.

Further, according to the present embodiment, the partition wall 45 that has a predetermined height to block the flow of the adhesive 43 is provided between the position where the adhering partition 42 is provided in an upright manner on the lower surface of the resin case 33 and the connector terminals 30A, 31A, 32A to be inserted into the motor terminal 28, making it possible to block the flow of the adhesive 43 when excess adhesive flows toward the connector terminals 30A, 31A, 32A provided at the tip of the busbar assembly 29 when pouring the adhesive 43 into the gap S to adhere the main substrate 17 and the busbar assembly 29, and thus eliminate the risk of the connector terminals 30A, 31A, 32A being sealed off by the adhesive 43. This makes it possible to prevent deterioration of assemblability by the reckless flow of the adhesive 43.

Note that the present invention is not limited to the invention according to the above-described embodiment and can be modified as required without departing from the spirit of the present invention. For example, while the above-described embodiment describes an example in which the substrate is divided into two substrates, the main substrate 17 and the sub-substrate 20, naturally the present invention may also be applied to a single substrate.

Further, while the above-described embodiment describes the busbar assembly 29 in which the UVW busbars 30, 31, 32 are integrated by being fitted with and installed in the grooves 37, 38, 39 inside the resin case 33 having the separate cover member 34 attached to the lower surface thereof, the present invention does not exclude application to a busbar assembly in which the three UVW busbars 30, 31, 32 are integrally insert-molded by a resin material and, needless to say, includes application to such a busbar assembly. In this case, the connecting portion may be welded or soldered to the motor terminal 28.

REFERENCE SIGNS LIST

1 Inverter-integrated electric compressor
2 Housing
3 Motor housing
7 Inverter device
8 Inverter housing portion
11 Filter circuit
12 Coil
13 Capacitor
15 Semiconductor switching element
15A Lead terminal
16 Control circuit (inverter circuit)
17 Main substrate (substrate)
28 Motor terminal
29 Busbar assembly
30, 31, 32 UVW busbar
30A, 31A, 32A Connector terminal
33 Resin case
34 Cover member
40 Fitting portion
41 Locking tab
42 Adhering partition
43 Adhesive
45 Partition wall
H Height of adhering partition
S Gap

The invention claimed is:
1. An inverter-integrated electric compressor comprising:
a housing;
an inverter housing portion provided to the housing;

an inverter device including a substrate having an inverter circuit mounted thereon, the inverter device being integrally incorporated in the inverter housing portion; and a busbar assembly formed by a UVW busbar covered by a resin case, the UVW busbar being configured to conduct AC power converted by the inverter circuit from the substrate side to a motor terminal provided in the inverter housing portion;

the busbar assembly including an adhering partition to be adhered to an end surface of the substrate using an adhesive, the adhering partition being provided in an upright manner on a lower surface of the resin case; a height and a gap of the adhering partition relative to the end surface of the substrate being set as appropriate; and the gap between the adhering partition and the end surface of the substrate being adhered directly and integrated to each other using the adhesive.

2. The inverter-integrated electric compressor according to claim 1, wherein the resin case includes a partition wall that has a predetermined height to block a flow of the adhesive, the partition wall being provided on the lower surface of the resin case, between a position where the adhering partition is provided in an upright manner and a connector terminal of the busbar assembly to be inserted into the motor terminal.

3. The inverter-integrated electric compressor according to claim 1, wherein the substrate has one side that is fixedly supported by the inverter housing portion via the busbar assembly and the motor terminal, and another two sides adjacent to the one side that are fixedly supported by the inverter housing portion via a coil and a capacitor that constitute a filter circuit of the inverter device, and a terminal group of a plurality of semiconductor switching elements that constitute the inverter circuit.

4. The inverter-integrated electric compressor, comprising:

a housing;

an inverter housing portion provided to the housing;

an inverter device including a substrate having an inverter circuit mounted thereon, the inverter device being integrally incorporated in the inverter housing portion; and a busbar assembly formed by a UVW busbar covered by a resin case, the UVW busbar being configured to conduct AC power converted by the inverter circuit from the substrate side to a motor terminal provided in the inverter housing portion;

the busbar assembly including an adhering partition to be adhered to an end surface of the substrate using an adhesive, the adhering partition being provided in an upright manner on a lower surface of the resin case; a height and a gap of the adhering partition relative to the end surface of the substrate being set as appropriate; and the adhering partition and the end surface of the substrate being adhered to each other using the adhesive, wherein a plurality of locking tabs are provided at predetermined intervals on the lower surface of the resin case of the busbar assembly where the adhering partition is provided in an upright manner, the locking tabs including fitting portions that fit together with an end portion of the substrate.

5. The inverter-integrated electric compressor according to claim 4, wherein the lower surface of the resin case of the busbar assembly where the adhering partition is provided in an upright manner is formed separately as a cover member, the cover member is assembled to the resin case by the locking tabs integrally formed with the resin case and passing through the cover member, and the adhering partition is adhered to the end surface of the substrate and to the locking tabs via the adhesive.

6. The inverter-integrated electric compressor according to claim 4, wherein the resin case includes a partition wall that has a predetermined height to block a flow of the adhesive, the partition wall being provided on the lower surface of the resin case, between a position where the adhering partition is provided in an upright manner and a connector terminal of the busbar assembly to be inserted into the motor terminal.

7. The inverter-integrated electric compressor according to claim 4, wherein the substrate has one side that is fixedly supported by the inverter housing portion via the busbar assembly and the motor terminal, and another two sides adjacent to the one side that are fixedly supported by the inverter housing portion via a coil and a capacitor that constitute a filter circuit of the inverter device, and a terminal group of a plurality of semiconductor switching elements that constitute the inverter circuit.

* * * * *